United States Patent [19]
Kobayashi

[11] Patent Number: 5,946,101
[45] Date of Patent: Aug. 31, 1999

[54] APPARATUS AND METHOD FOR DETECTING A POSTURE

[75] Inventor: Seiji Kobayashi, Kanagawa, Japan

[73] Assignee: Sony Corporation, Tokyo, Japan

[21] Appl. No.: 08/978,760

[22] Filed: Nov. 26, 1997

Related U.S. Application Data

[62] Division of application No. 08/796,615, Feb. 7, 1997.

[30] Foreign Application Priority Data

Feb. 9, 1996 [JP] Japan .................................. 8-024212

[51] Int. Cl.$^6$ ........................... G01B 11/24; G01B 11/00
[52] U.S. Cl. .......................... 356/376; 356/372; 356/377; 356/401
[58] Field of Search .................... 356/376, 372, 356/373, 377, 371, 401, 345

[56] References Cited

U.S. PATENT DOCUMENTS 4,906,099  3/1990  Casasent ................................ 356/394

OTHER PUBLICATIONS

W. K. Smothers et al., "Photopolymers For Holography," Proceedings, SPIE, Practical Holography IV, vol. 1212, Jan. 18–19, 1990, Los Angeles.

Primary Examiner—Robert H. Kim
Assistant Examiner—Roy M. Punnoose
Attorney, Agent, or Firm—Limbach & Limbach LLP

[57] ABSTRACT

This invention provides a posture detecting apparatus capable of quickly determining, without depending on any complicated signal processing, which one of a plurality of reference postures a given human posture coincides with, or that it coincides with none of them.

Upon a hologram wherein images corresponding with a plurality of reference postures have been recorded by the help of the corresponding reference beams each having a different incident angle, focused is a beam which has been spatially modulated by the LCD (liquid crystal display) panel which has displayed the human posture to be detected. When the human posture in question coincides with one of the reference postures, from the hologram emanates a beam which takes the same path with that the reference beam corresponding with that reference posture takes for impinging on the hologram. A beam detector detects the beam emanating from the hologram.

21 Claims, 5 Drawing Sheets

APPARATUS AND METHOD FOR DETECTING A POSTURE

This is a divisional of application Ser. No. 08/796,615, filed Feb. 7, 1997.

BACKGROUND OF THE INVENTION

To date a number of systems for detecting changes in human posture have been proposed which consist of taking pictures of a human body or parts of it with a CCD (solid-state imaging elements) camera, and of analyzing human posture or parts of it based on image signals (electric signals) delivered from the CCD camera.

With such human posture detecting systems, image signals from the CCD camera are processed by a signal processing system (computer), whereby the posture of the human body or its parts is analyzed and identified.

Such human posture detecting system has such a constitution that the identified posture of human body or its parts can be compared with reference postures stored in a memory. With such constitution, the system can be utilized for a game machine or a posture evaluating system.

For example, with such human posture detecting system, necessary data regarding a plurality of reference postures are read out from a memory, and displayed on a monitor one after another, so that, each time a reference posture appears on the monitor, it is compared with the posture of a human body or its part reproduced from the image signals delivered from the CCD camera, then whether or not the reproduced posture coincides with the reference posture is determined, and the number of coincidences is counted for determining the winner in a game, or the count itself serves as a score(mark).

With said posture detecting system, however, information the image signal carries is so huge in amount that, even though a high performance system is used for processing the image signal, it requires a long time for processing such a vast amount of information.

Accordingly, with this type of posture detecting system, it takes so much time to determine whether or not the reproduced posture of a human body or its parts coincides with a given reference posture, that comparison of the reproduced posture with a plurality of reference postures delivered rapidly one after another to determine the identity of the reproduced posture is practically impossible. In short, it is practically very difficult for this type of posture detecting system to be used as an element, as said earlier, of a game machine, or as a posture evaluating system.

SUMMARY OF THE INVENTION

This invention was proposed in view of above circumstances, and tries to provide a posture detecting apparatus which allows a rapid and secure determination of whether a given reproduced posture of a human body or its parts coincides with any one of a plurality of reference postures recorded in a recording medium.

To achieve the object, the posture detecting method of this invention utilizes a light source; an image data feeding means to feed the posture of a human body or its parts as image data; a spatial modulating means to modulate the amplitude distribution of a beam from the light source according to the image data fed by the image data feeding means; a data recording medium in which a plurality of reference images have been recorded; an optical means to focus the data bearing beam modulated by the spatial modulating means onto the data recording medium; and a plurality of optical detecting means to analyze a beam emanating from the data recording medium at positions having different angles with respect to the data recording medium.

The reference image data recorded in the data recording medium are formed through interference between the data bearing beam and the corresponding reference beam.

The beam from the light source is modulated in its amplitude distribution by the spatial modulating means according to the image data which have been fed by the image data feeding means, and corresponds with one of a plurality of reference images, to produce a data bearing beam. Thus, the data bearing beams are plural and the same in number with the reference postures.

At the same time a data bearing beam is focused by the optical means onto the data recording medium, the corresponding reference beam is focused onto the data recording medium. This applies for each of the plurality of data bearing beams.

The incident angle of the reference beam with respect to the data recording medium is comparable with the angle of the optical detecting means with respect to the data recording medium.

In other words, the optical detecting means is arranged in the line along the central axis of the corresponding reference beam, or its proximity. The posture detecting method of this invention further utilizes: a reference posture image feeding means to produce image signals corresponding with the plurality of reference postures and to select one from among them as appropriate; an image displaying means to which the image signal from the reference posture image feeding means is delivered to be displayed thereupon; and a signal processing means to which is delivered a discrimination signal indicating which beam detecting means detects the beam emanating from the data recording medium, and a selection signal indicating which reference posture is represented by the signal from the reference posture feeding means, and being constructed such that the signal processing means compares the discrimination signal and the selection signal, and delivering a judgment signal as output as a result of the comparison.

The posture detecting method of this invention further utilizes the signal processing means to dispatch a judgment signal as output only when the discrimination signal and the selection signal coincide with each other.

DESCRIPTION OF THE PREFERRED EMBODIMENT

Figure 1:
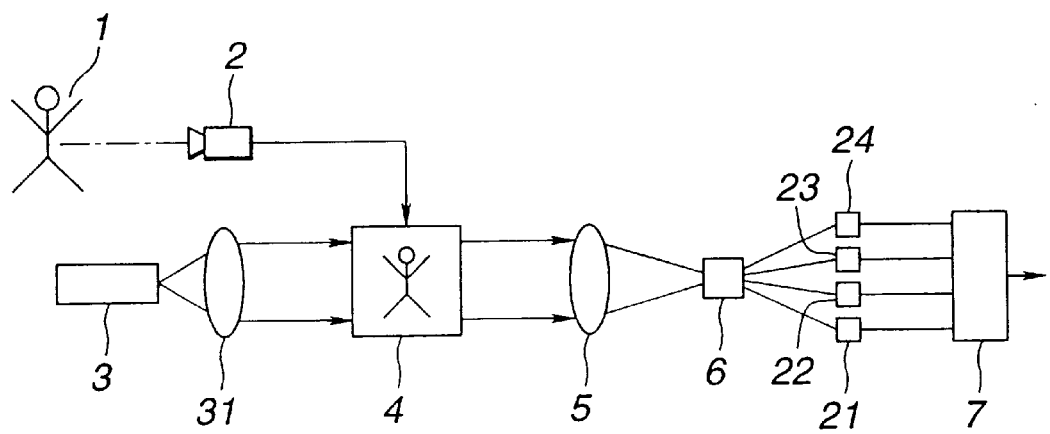
FIG. 1 is a schematic diagram illustrating the constitution of the posture detecting apparatus of this invention.

The posture detecting method of this invention utilizes an apparatus, as shown in FIG. 1, provided with a laser oscillator 3 which acts as a light source. This laser oscillator emits a coherent laser beam. The laser beam emitted from this laser oscillator 3 is directed towards a collimator lens 31 which turns it into a parallel beam.

The posture detecting apparatus is further provided with a CCD (solid-state imaging element) camera 2 which acts as a means for feeding the image data representing the posture of human body 1 (or a part of human body 1). This CCD camera 2 converts the image of the posture of a human body into image data (electric signals) and delivers them as output.

The image data are transmitted to an LCD (liquid crystal display) panel 4 which acts as a spatial modulation means. This LCD panel 4 displays an image corresponding with the image data. This LCD panel reproduces the shades (tone) of the image to be displayed in terms of differences in transmittance through the LCD panel 4.

Then, this LCD panel 4 modulates the amplitude distribution of the laser beam emitted by the laser oscillator 3 according to the image data. Namely, the laser beam passing through the collimator lens 31 falls upon the LCD panel at a predetermined incident angle. The laser beam falling upon the LCD panel at a predetermined incident angle has its amplitude distribution modulated according to the image data displayed on the LCD panel 4, and the modulated beam transmits through (or is reflected from) the LCD panel to become a data bearing beam.

The data bearing beam which has had its amplitude distribution modulated on the LCD panel 4 impinges upon a condenser lens 5 which acts as an optical means. This condenser lens 5 focuses the incident data bearing beam onto a hologram 6 which acts as a data recording medium, at a predetermined incident angle.

Figure 2:
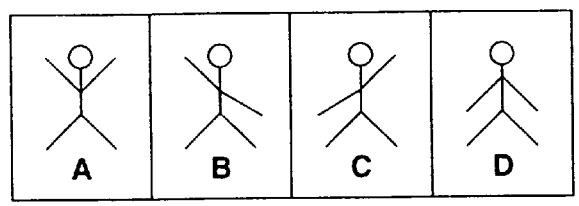
FIG. 2 is a front view of the first to fourth reference postures recorded in the posture detecting apparatus.

The hologram 6 stores, by a method described later, a plurality of reference image data corresponding with, for example, reference postures A, B, C and D, as shown in FIG. 2. This hologram 6 has a glass plate and a photosensitive material coated on the glass plate.

The photosensitive material may be any material employed for general photographic use, or commercially available for volume holography. When a material for volume holography is used as the photosensitive material, that material should be coated on the glass plate as a film with a thickness of several tens of micrometers ($\mu$m). The material for volume holography to be used in this invention includes, for example, one provided by DuPont as described by W. K. Smothers et al. ("Photopolymers for holography", in: Practical Holography IV, SPIE OE/Laser Conference Proceedings, 1212-03, Los Angeles, Calif., January, pp14–19, 1990).

On the same side of the hologram 6 upon which the data bearing beam impinges are a plurality of beam detectors, or first to fourth beam detectors 21, 22, 23 and 24 which are arranged at different angles with respect to the hologram 6, and act as beam detecting means by detecting the beam emanating from the hologram 6. In FIG. 1, for illustration, first to fourth beam detectors 21, 22, 23 and 24 and a maximum detecting circuit 7 are placed opposite to the side of the hologram towards which the data bearing beam advances, with the hologram 6 as a center. In reality, however, those beam detectors and the maximum detecting circuit are placed in a position turned 180° from the position illustrated round the hologram 6. Further, the first to fourth beam detectors 21, 22, 23 and 24 are so arranged as to receive the below-described beam emanating from the hologram 6. Each of the first to fourth beam detectors 21, 22, 23 and 24 has a photosensitive element such as a photodiode, and, on receiving the beam from the hologram 6, generates a detection output. The detection outputs generated by the beam detectors 21, 22, 23 and 24 are transmitted to the maximum detecting circuit 7. This maximum detecting circuit 7 determines which one is the biggest of all the detection outputs transmitted from the beam detectors 21, 22, 23 and 24, and expresses the result as a discrimination signal.

The plurality of reference image data stored in the hologram 6 are produced by the procedure whereby: the beam from the laser oscillator 3 has its amplitude distribution modulated on the LCD panel 4 according to one kind of image data corresponding with any one of reference postures A, B, C and D which have been delivered by the CCD camera 2, to produce a data bearing beam; the data bearing beam is focused through the condenser lens 5 upon the hologram 6; at the same time the corresponding reference beam falls upon the hologram 6; these two beams interfere with each other to produce the reference image data in the hologram 6; and the same process is repeated for the remaining image data corresponding with other reference postures.

Figure 3:
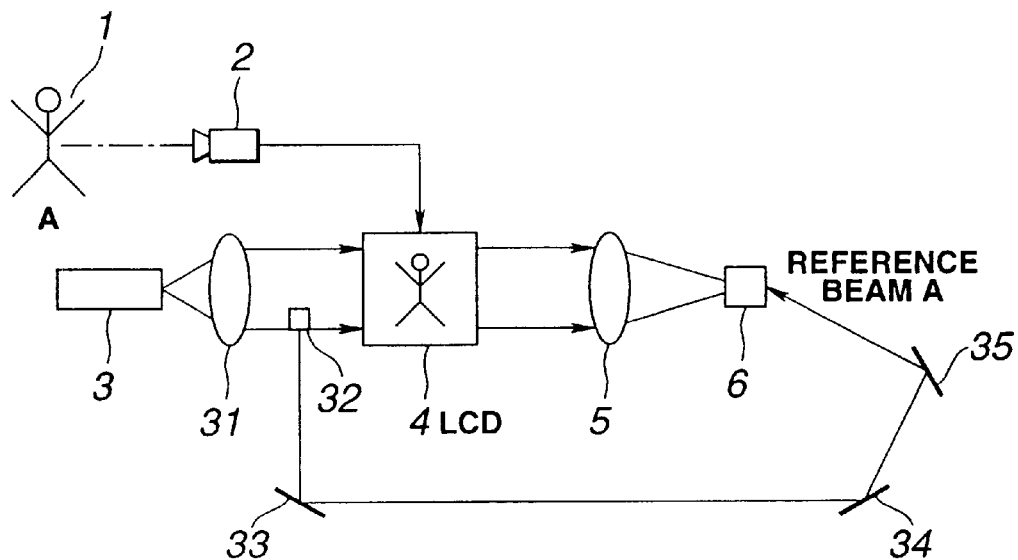
FIG. 3 is a diagram illustrating, in a lateral view, how the image data from the first reference posture is recorded by the posture detecting apparatus.

To record the first image data corresponding with the first reference posture A into the hologram 6, the first reference posture A is converted by the CCD camera 2 to the corresponding image data which serve as an input, as shown in FIG. 3.

Then, the LCD panel 4 displays the image carried by the first image data. In addition, the LCD panel 4 modulates the amplitude distribution of the beam from the laser oscillator 3 according to the first image data, to produce a first data bearing beam. The first data bearing beam is focused through the condenser lens 5 upon the hologram 6.

On the other hand, a part of laser beam is branched off from the laser beam with a beam splitter 32 at a midway to the LCD panel 4, and allowed to reflect upon mirrors 33, 34 and 35, and to fall upon the hologram 6 as a first reference beam A. This reference beam A corresponds with the first data bearing beam, and impinges upon the hologram 6 with a first reference incident angle.

The first data bearing beam and the first reference beam interfere with each other to produce first reference image data having a striped pattern, which is recorded in the hologram.

The first reference incident angle corresponds to the angle with which the first beam detector 21 faces towards the hologram 6.

Figure 4:
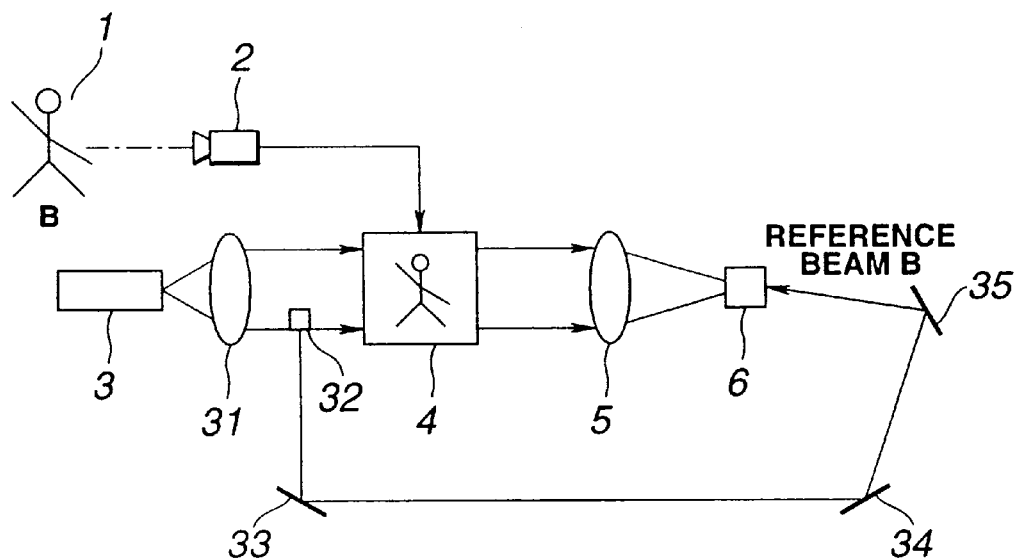
FIG. 4 is a diagram illustrating, in a lateral view, how the image data from the second reference posture is recorded by the posture detecting apparatus.

To record the second image data corresponding with the second reference posture B into the hologram 6, the second reference posture B is converted by the CCD camera 2 to the corresponding image data which serve as an input, as shown in FIG. 4.

Then, the LCD panel 4 displays the image carried by the second image data. In addition, the LCD panel 4 modulates the amplitude distribution of the beam from the laser oscillator 3 according to the second image data, to produce a second data bearing beam. The second data bearing beam is focused through the condenser lens 5 upon the hologram 6.

On the other hand, a part of laser beam is branched off from the laser beam with the beam splitter 32 at a midway to the LCD panel 4, and allowed to reflect upon mirrors 33, 34 and 35, and to fall upon the hologram 6 as a second reference beam B. This second reference beam B corresponds with the second data bearing beam, and impinges upon the hologram 6 with a second reference incident angle.

The second data bearing beam and the second reference beam interfere with each other to produce second reference image data having a striped pattern, which is recorded in the hologram.

The second reference incident angle corresponds to the angle with which the second beam detector 22 faces towards the hologram 6.

Figure 5:
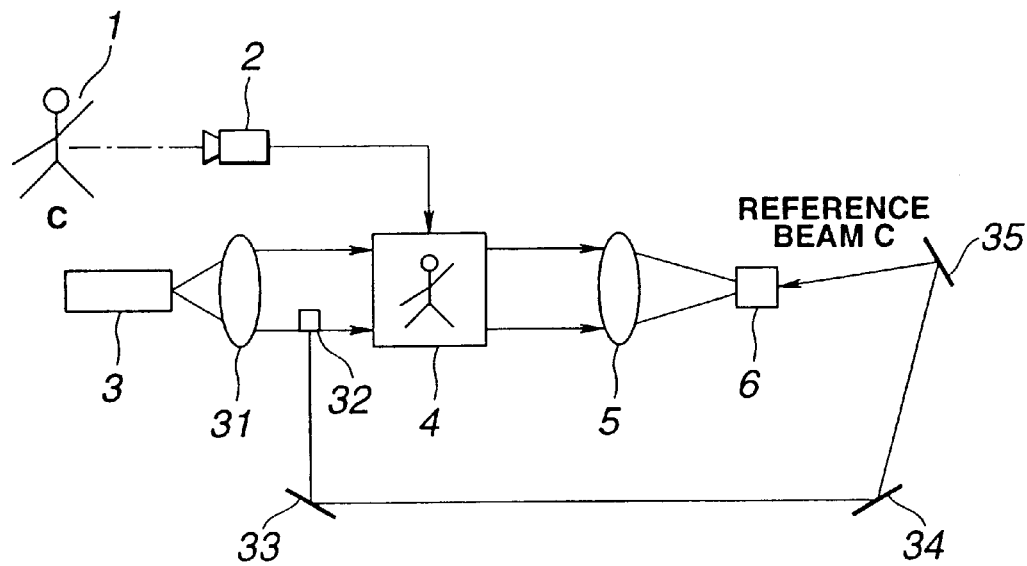
FIG. 5 is a diagram illustrating, in a lateral view, how the image data from the third reference posture is recorded by the posture detecting apparatus.

To record the third image data corresponding with the third reference posture C into the hologram 6, the third reference posture C is converted by the CCD camera 2 to the corresponding image data which serve as an input, as shown in FIG. 5.

Then, the LCD panel 4 displays the image carried by the third image data. In addition, the LCD panel 4 modulates the amplitude distribution of the beam from the laser oscillator 3 according to the third image data, to produce a third data bearing beam. The third data bearing beam is focused through the condenser lens 5 upon the hologram 6.

On the other hand, a part of laser beam is branched off from the laser beam with the beam splitter 32 at a midway to the LCD panel 4, and allowed to reflect upon mirrors 33, 34 and 35, and to fall upon the hologram 6 as a third reference beam C. This third reference beam C corresponds with the third data bearing beam, and impinges upon the hologram 6 with a third reference incident angle.

The third data bearing beam and the third reference beam interfere with each other to produce a third reference image data having a striped pattern, which is recorded in the hologram.

The third reference incident angle corresponds with the angle with which the third beam detector 23 faces towards the hologram 6.

Figure 6:
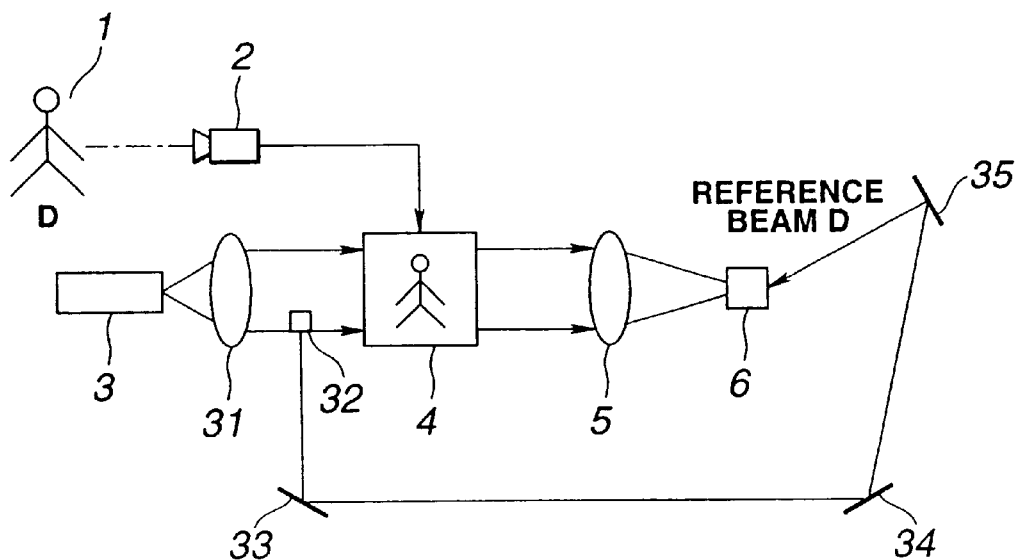
FIG. 6 is a diagram illustrating, in a lateral view, how the image data from the fourth reference posture is recorded by the posture detecting apparatus.

To record the fourth image data corresponding to the fourth reference posture D into the hologram 6, the fourth reference posture D is converted by the CCD camera 2 to the corresponding image data which serve as an input, as shown in FIG. 6.

Then, the LCD panel 4 displays the image carried by the fourth image data. In addition, the LCD panel 4 modulates the amplitude distribution of the beam from the laser oscillator 3 according to the fourth image data, to produce a fourth data bearing beam. The fourth data bearing beam is focused through the condenser lens 5 upon the hologram 6.

On the other hand, a part of laser beam is branched off from the laser beam with the beam splitter 32 at a midway to the LCD panel 4, and allowed to reflect upon mirrors 33, 34 and 35, and to fall upon the hologram 6 as a fourth reference beam D. This reference beam D corresponds with the fourth data bearing beam, and impinges upon the hologram 6 with a fourth reference incident angle.

The fourth data bearing beam and the fourth reference beam interfere with each other to produce fourth reference image data having a striped pattern, which is recorded in the hologram.

The fourth reference incident angle corresponds to the angle with which the fourth beam detector 24 faces towards the hologram 6.

Thus, the first to fourth reference image data are recorded in succession one over another into the hologram 6, which is then exposed to ultraviolet rays so that those reference image data become stabilized.

The plurality of reference postures A, B, C and D of a human body may include postures representative of the whole human body 1 or of parts thereof.

Figure 7:
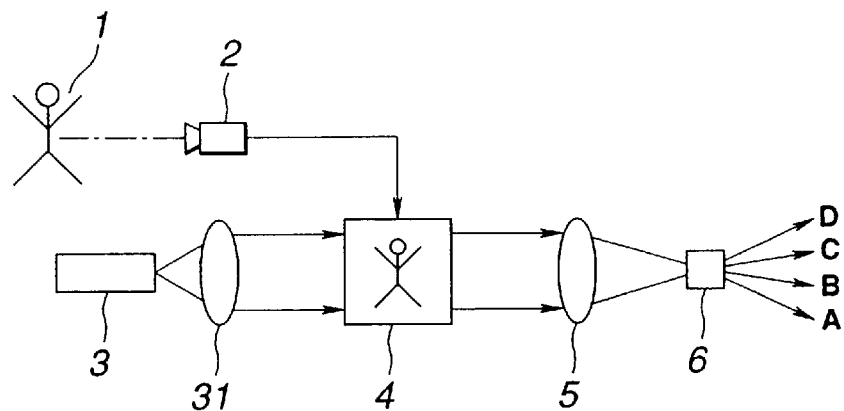
FIG. 7 is a diagram illustrating the mechanism whereby the posture detecting apparatus can discriminate different image data.

As shown in FIG. 7, when a data bearing beam is focused via the LCD panel 4 onto the hologram 6 which has stored the plurality of image data, a strong beam emanates from the hologram 6 along the same path (in the reverse direction) with that taken by the reference beam which forms part of the beam whose amplitude distribution has been modulated at the LCD panel 4 according to the image data of a reference posture to produce the same data bearing beam. In FIG. 7, beams emanating from the hologram 6 are displayed opposite to the side from which they emanate in reality, for illustration.

When an image which corresponds with the first reference posture A of the human body 1 is displayed in the LCD panel 4, a beam emanates from the hologram 6 in the same direction with the incident angle of the first reference beam. The beam thus emanating from the hologram 6 in the same direction with the incident angle of the first reference light is captured by the first beam detector 21.

Further when an image which corresponds with the second reference posture B of human body 1 is displayed in the LCD panel 4, a beam emanates from the hologram 6 in the same direction with the incident angle of the second reference beam. The beam thus emanating from the hologram 6 in the same direction with the incident angle of the second reference light is captured by the second beam detector 22.

Still further, when an image which corresponds with the third reference posture C of human body 1 is displayed in the LCD panel 4, a beam emanates from the hologram 6 in the same direction with the incident angle of the third reference beam. The beam thus emanating from the hologram 6 in the same direction with the incident angle of the third reference light is captured by the third beam detector 23.

Still further, when an image which corresponds with the fourth reference posture D of human body 1 is displayed in the LCD panel 4, a beam emanates from the hologram 6 in the same direction with the incident angle of the fourth reference beam. The beam thus emanating from the hologram 6 in the same direction with the incident angle of the fourth reference light is captured by the fourth beam detector 24.

When an image close to any one of those reference postures A, B, C and D is displayed in the LCD panel 4, a weak beam emanates from the hologram 6 in the same direction with the incident angle of the reference beam which has been produced when the image data corresponding with the reference posture most close to the image in question have been transmitted to the hologram for storage. The intensity of the beam emanating from the hologram 6 varies according to how close the reference posture is to the given image displayed on the LCD panel 4. Accordingly, when an image is displayed on the LCD panel that is quite unlike any one of the reference postures, the hologram 6 radiates beams in all the directions which are equally weak in intensity.

Through the above procedure, this posture detecting method allows one to determine which image representing the posture of the human body 1 and reproduced through image data fed by the CCD camera 2 coincides with (or is very close to), of all the reference postures A, B, C, and D, by referring to a judgment signal delivered from the maximum detecting circuit 7.

It should be noted here that the posture detecting apparatus here concerned depends on a so-called reflection-type hologram upon which the data bearing beam and reference beam fall from the same side. It is needless to say that the posture detecting apparatus of this invention can be constituted by incorporating a so-called transmission-type hologram upon which the data bearing beam and reference beam fall from different sides.

Figure 8:
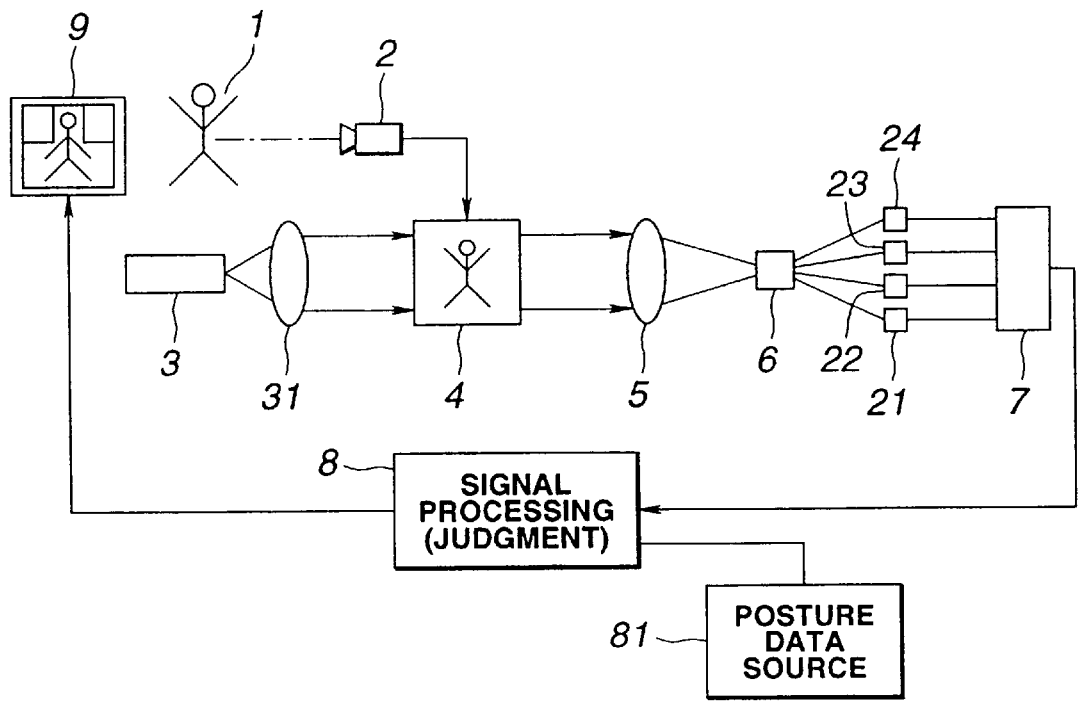
FIG. 8 is a diagram illustrating the constitution of the posture detecting apparatus which is incorporated into a game machine.
Figure 9:
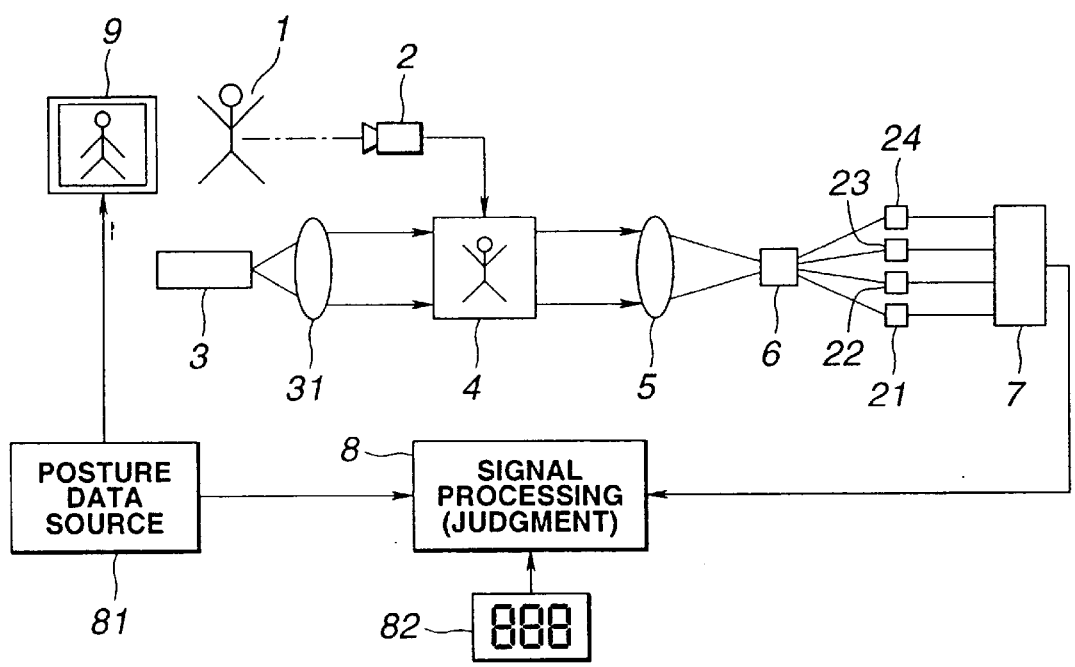
FIG. 9 is a diagram illustrating the constitution of the posture detecting apparatus which is incorporated into a posture evaluating system.

The posture detection apparatus of this invention, as shown in FIGS. 8 and 9, can be utilized as a game machine or a posture evaluating system, by supplementing with a posture data source 81 which acts as a reference posture image data feeding means, and a signal processing circuit 8 which acts as a signal processing means.

In FIGS. 8 and 9 as well as in FIG. 1, the first to fourth beam detectors 21, 22, 23 and 24 and the maximum detecting circuit 7 are arranged, for illustration, on the same side of the hologram 7, as opposed to reality. In the game machine illustrated in FIG. 8, the posture data source 81 operates under the control of the signal processing circuit 8, evokes the image signals corresponding with the plurality of reference postures stored in the hologram 6, delivers as output those image signals selected according to a predetermined game program. The image signals are transmitted via the signal processing circuit 8 to the monitor 9 which acts as an image displaying means. This monitor 9 displays images represented by the image signals transmitted via the signal processing circuit 8.

Also transmitted to the signal processing circuit 8 are a discrimination signal which indicates which one of the beam detectors 21, 22, 23 and 24 receives the beam emanating from the hologram 6, and a selection signal which indicates what posture has been selected from the posture data source 81.

The signal processing circuit 8, after comparing the discrimination signal and selection signal, delivers a judgment signal as output. For example, let's assume that a game proceeds under the following rules:

1) When posture A confronts with posture B, posture A defeats posture B, and the winner gets 50 marks;
2) When posture A confronts with posture C, posture A defeats posture C, and the winner gets 50 marks;
3) When posture B confronts with posture C, posture B defeats posture C, and the winner gets 50 marks;
4) When posture B confronts with posture D, posture B defeats posture D, and the winner gets 50 marks;
5) When posture C confronts with posture D, posture C defeats posture D, and the winner gets 100 marks; and
6) When posture D confronts with posture A, posture D defeats posture A, and the winner gets 100 marks.

The match is repeated a predetermined number of times (say 10 times), and one who has got the highest marks will be the winner. Further, a player playing with this machine, in timing appropriate for the progress of the game program, choose any one from the above reference postures and assumes a posture similar to the reference posture chosen in front of the CCD camera.

The signal processing circuit 8, based on the discrimination signal, determines which one of the reference postures A, B, C and D coincides with the posture the game player has assumed, and, at the same time, determines, based on the selection signal, which one the image signal delivered from the posture data source 81 coincides with, of all the reference postures A, B, C, and D. Then, the signal processing circuit determines, for the posture assumed by the player and the posture chosen according to the game program, which defeats which, and delivers its judgment as a judgment signal to the monitor 9 to be displayed.

In a posture evaluating system illustrated in FIG. 9, the posture data source 81 evokes image signals corresponding with a plurality of reference pictures stored in the hologram 6, and delivers as output these image signals selectively in a predetermined order according to the program. The image signals are transmitted to the monitor 9. The monitor displays images corresponding with the image signals transmitted from the posture data source 81.

Then, the posture data source 81 delivers the selection signal which indicates with which reference posture the image signal chosen according to the program corresponds, to the signal processing circuit 8. Also transmitted to the signal processing circuit 8 is a discrimination signal which indicates which one of the beam detectors 21, 22, 23 and 24 detects the beam emanating from the hologram 6. Further, to the signal processing circuit 8 connected is a mark indicator 82 which displays a mark as an evaluation.

The signal processing circuit 8, based on the comparison of the discrimination and selection signals, delivers a judgment signal as output. For example, let's assume that image signals chosen according to the program represent a series of postures (in order of time) in dancing or gymnastics. The user of this posture detecting apparatus stands in front of the CCD camera 2, and changes his/her posture in accordance with the posture displayed on the monitor 9.

The signal processing circuit 8, based on the discrimination signal, determines with which one of the reference postures A, B, C and D the user's posture corresponds, and, at the same time, determines, based on the selection signal, with which one of the reference postures A, B, C and D the image signals delivered from the posture data source 81 according to the program corresponds.

The signal processing circuit 8 delivers a judgment signal only when the discrimination and selection signals coincide with each other. Namely, the signal processing circuit 8 determines whether or not the user's posture coincides with the posture chosen in accordance with the program. The number of delivered judgment signals is counted by the signal processing circuit 8, and converted through a predetermined factor to a mark which is indicated by the mark indicator 82.

What is claimed is:

1. A method of detecting a present image corresponding to one of a plurality of stored reference images, comprising the steps of:

feeding a data bearing beam including the present image to a holographic element wherein a plurality of reference posture images have been recorded by use of a plurality of reference beams each having a different incident angle;

detecting the intensity and direction of an emanating beam emanating from the holographic element when the data bearing beam is fed to the holographic element; and determining whether and, if so, which one of the plurality of stored reference images coincides with the present image, based on the intensity and direction of the emanating beam.

2. The method of claim 1, further comprising the step of dispatching a judgment signal as output when one of the plurality of reference images coincides with the present image.

3. The method of claim 1, further comprising the step of determining whether one of the plurality of reference images coincides with the present image by comparing a signal level of the emanating beam with a reference signal level.

4. The method of claim 1, further comprising the step of modulating an original laser oscillator beam comprising each of said plurality of reference beams and said data bearing beam.

5. The method of claim 4, further comprising the step of splitting said original beam, thereby separating said plurality of reference beams from said data bearing beam.

6. The method of claim 1, further comprising the step of interfering each of said plurality of reference beams with said data bearing beam to produce said emanating beam.

7. The method of claim 1, further comprising the step of storing the plurality of reference images in a holographic element, each by a different reference beam and at a unique reference beam angle.

8. The method of claim 7, wherein each of said plurality of stored reference images and said present image is two-dimensional.

9. The method of claim 1, wherein each of said plurality of stored reference images and said present image is two-dimensional.

10. The method of claim 1, further comprising the step of positioning a plurality of detectors each at a different one of a plurality of unique reference beam angles to detect an emanating beam emanating from the holographic element when the corresponding one of the plurality of stored references images matches the present image when the data bearing beam is fed to the holographic element.

11. The method of claim 10, wherein the detecting step further comprises the step of detecting light emanating from the holographic element at a plurality of angles corresponding to the unique reference beam angles at which at least some of the plurality of stored reference images were recorded.

12. The method of claim 7, further comprising the step of positioning a plurality of detectors each at a different one of the plurality of unique reference beam angles to detect an emanating beam emanating from the holographic element when the corresponding one of the plurality of stored references images stored in the holographic element matches the present image when the data bearing beam is fed to the holographic element.

13. The method of claim 12, wherein the detecting step further comprises the step of detecting light emanating from the holographic element at a plurality of angles corresponding to the unique reference beam angles at which at least some of the plurality of stored reference images were recorded.

14. A method of detecting a present two-dimensional image corresponding to one of a plurality of two-dimensional reference images, comprising the steps of:
recording holographically a plurality of two-dimensional reference images in a holographic element, each by a different reference beam and at a unique reference beam angle;
feeding a data bearing beam including the present two-dimensional image to the holographic element;
detecting the intensity and direction of an emanating beam emanating from the holographic element when the data bearing beam is fed to the holographic element; and
determining whether and, if so, which one of the plurality of two-dimensional reference images coincides with the present two-dimensional image, based on the intensity and direction of the emanating beam.

15. The method of claim 14, further comprising the step of dispatching a judgment signal as output when one of the plurality of two-dimensional reference images coincides with the present two-dimensional image.

16. The method of claim 14, further comprising the step of determining whether one of the plurality of two-dimensional reference images coincides with the present two-dimensional image by comparing a signal level of the emanating beam with a reference signal level.

17. The method of claim 14, further comprising the step of modulating an original laser oscillator beam comprising each of said plurality of reference beams and said data bearing beam.

18. The method of claim 17, further comprising the step of splitting said original beam, thereby separating said plurality of reference beams from said data bearing beam.

19. The method of claim 1, further comprising the step of interfering each of said plurality of reference beams with said data bearing beam to produce said emanating beam.

20. The method of claim 14, further comprising the step of positioning a plurality of detectors each at a different one of the plurality of unique reference beam angles to detect an emanating beam emanating from the holographic element when the corresponding one of the plurality of references images recorded on the holographic element matches the present image when the data bearing beam is fed to the holographic element.

21. The method of claim 20, wherein the detecting step further comprises the step of detecting light emanating from the holographic element at a plurality of angles corresponding to the unique reference beam angles at which at least some of the plurality of two-dimensional reference images were recorded.

* * * * *